Patented Aug. 14, 1923.

1,464,928

UNITED STATES PATENT OFFICE.

CHARLES N. FORREST, OF RAHWAY, NEW JERSEY, ASSIGNOR TO THE BARBER ASPHALT COMPANY, OF PHILADELPHIA, PENNSYLVANIA, A CORPORATION OF WEST VIRGINIA.

BITUMINOUS EMULSION.

No Drawing.   Application filed April 7, 1920.   Serial No. 371,884.

*To all whom it may concern:*

Be it known that I, CHARLES N. FORREST, a citizen of the United States, and a resident of Rahway, in the county of Union and State of New Jersey, have invented certain new and useful Improvements in Bituminous Emulsions, whereof the following is a specification.

My invention relates to bituminous emulsion having capabilities that make it especially valuable and advantageous as a binder for broken stone, slag, sand, or other mineral aggregate or road material used in the construction, repair, or general maintenance of street pavements or roadways, or as a dust preventive or palliative. Such bituminous emulsion is also useful and advantageous for a great variety of other purposes.

Bituminous emulsions have heretofore comprised a bituminous oil asphalt, or other base, emulsified with water and an emulsient agent such as a soap produced by saponification of rosin, rosin oil, red oil, or other available animal or vegetable oil or fat,—in brief, an ammonia or potash soap within the ordinary meaning of the terms. Such an emulsion can be made up and shipped in a convenient state of concentration, and can subsequently be diluted with water to any extent desired. When mineral or other road material is mixed with such emulsion and spread and compacted on a road, the water spontaneously evaporates and leaves the bituminous base "set" as an effective binder for the mineral aggregate,—just as if the base had originally been mixed with the mineral while rendered fluid by heat, according to older practices. Very curiously, the drying out of this original water is not a reversible phenomenon; on the contrary, while such drying leaves the soap with the bitumen, this soap is incapable of acting as an emulsient to enable the bitumen to take up water again. Such immiscibility of its binder with water is, of course, highly important to the cohesion and stability of a roadway or pavement in wet weather.

Notwithstanding these properties, these bituminous emulsions hitherto known have been subject to a very serious drawback. In cold weather, they would freeze and "break," with the result of ultimate separation into distinct layers of water and bitumen that would not again emulsify together. This, of course, prevented shipment of the emulsion in cold weather,—a very serious interference with its use in the early spring to make good the deterioration of pavements during the winter months (when repairs could not be made), in preparation for the heavy traffic of the late spring and the summer. Moreover, such emulsions were readily broken and rendered useless by very slight accidental contamination with common salt or other electrolyte.

Not only does the bituminous emulsion of my present invention possess the important properties and advantages of the emulsions of the prior art, but when prepared as hereinafter described it is free from their drawbacks just set forth.

Thus it can be made with an original water content of any desired amount, so as to be of any desired consistency or fluency from ordinarily liquid to semi-solid, or even harder; it is miscible with water in all proportions; it is inseparable, in that it does not break permanently as above described when frozen or when mixed with electrolyte; it forms an excellent binder for road material after its own water content has evaporated, and is rendered immiscible with water by such drying out. Such bituminous emulsion can, I have discovered, be prepared with the aid of an emulsifying agent produced by treatment with sulphuric acid of mineral and other hydro-carbon oils,—such as crude petroleum and oil distillates from the destructive distillation of solid bitumens, including distillates produced from gilsonite as described in my application Serial No. 318,536, filed August 19, 1919, "Gilsonite products and their manufacture." In the case of such distillates, it is economical and advantageous to use and treat only a selected and especially appropriate fraction of the crude or primary oil distillate in producing the mineral oil derivative to be employed as an 'emulsient,—such fraction being obtained by fractional redistillation or reduction, (which latter, as understood in this art, is merely a redistillation not carried to the point of final completion or dryness). In general, the heavier and medium fractions (which are commercially the less valuable) are to be preferred. In speaking of the treatment of hydrocarbon oils with sulphuric acid, it must be understood that I intend to include their treatment with sulphuric anhydride as well as ordinary liquid sulphuric acid, such as oil of vitriol or fuming acid.

Thus for example the emulsifying agent may be prepared by treating mineral oil distillate with strong sulphuric acid, regulating the temperature of the reaction between 80° F. and 150° F. I may take 750 gallons of distillate oil boiling, say, between 400° F. and 700° F., and having a gravity of about 35° Baumé; this is agitated in a water-jacketed iron kettle and about 81 gallons of 98% sulphuric acid added gradually, in small, equal increments, during a period of about 8 hours. After this treatment, the batch is poured slowly and with constant agitation into some 200 gallons of clear, cool water. When this operation is finished, the mixture is allowed to rest undisturbed for several hours, whereupon it separates into three distinct layers—the bottom layer being dilute sulphuric acid, the middle layer mingled oil (representing in the main, as it appears, reaction products derived from the treatment of the mineral oil) and dilute sulphuric acid, and the top layer a clear oil (in the main, apparently, residual). These are separated in any convenient manner,—the middle layer of course, furnishing the emulsifying agent. For this purpose, it may be purified by neutralization with caustic soda and reacidulation with hydrochloric acid. The amount of this agent thus obtained is some 200 gallons. It is a viscous liquid, dark brown to black in color, and of acid reaction; it contains about 25% water, and is insoluble in oils and solvents of oils, but freely soluble in alcohol and water; and it foams copiously when shaken with water. Its composition is somewhat obscure, but it may conveniently be referred to as a mineral oil derivative of sulphuric acid.

When this agent is mixed and violently agitated with bituminous base such as mineral oil or natural or artificial asphalt, a stable, permanent emulsion is formed. In the manufacture of a road binder emulsion, I may mix 6 parts of this agent with 66 parts of heavy asphaltic base or oil,—such as petroleum residuum, natural asphalt fluxed with oil to about the consistency of petroleum residuum, coal-tar, or the like—warmed to about 190° F. to make it flow freely. These having been thoroughly agitated together in any convenient manner, I add and mix in 28 parts of clear water. The resultant product contains about 30% water, is brown to black in color; weighs about 8.5 lbs., per U. S. gallon; will flow at 60° F.; and has the various useful properties already set forth.

Having thus described my invention, I claim:

1. Bituminous material comprising oil base aqueously emulsified with a mineral oil derivative of sulphuric acid, freely miscible with water, and unbroken by freezing.

2. Bituminous material comprising bituminous base aqueously emulsified with a distillate of mineral oil derivative of sulphuric acid, freely miscible with water, and unbroken by freezing or by the presence of electrolyte.

3. Fluent bituminous material, serviceable as binder for road material, comprising bituminous oil aqueously emulsified with a mineral oil derivative, of sulphuric acid, freely miscible with water, and unbroken by freezing.

4. Fluent bituminous material, serviceable as road cement or binder, comprising heavy asphaltic oil base aqueously emulsified with a mineral oil derivative of sulphuric acid distillate, freely miscible with water, but in road use rendered immiscible by drying and unbroken by freezing.

5. Fluent bituminous material, serviceable for road cement or binder, comprising a bituminous base together with a mineral oil derivative of sulphuric acid as an emulsifying agent, freely miscible with water, but in road use rendered immiscible by drying out of such water.

6. Fluent bituminous material, serviceable for road cement or binder, comprising a bituminous base together with an acid mineral oil derivative of sulphuric acid as an emulsifying agent, freely miscible with water, but in road use rendered immiscible by drying out of such water.

In testimony whereof, I have hereunto signed my name at Maurer, N. J., this 1st day of April 1920.

CHARLES N. FORREST.

Witnesses:
 ALBERT J. HOLLENBACH,
 EDWARD RITTER.